United States Patent Office 3,547,788
Patented Dec. 15, 1970

3,547,788
INSULATED WIRE AND METHOD OF MAKING THE SAME
Toshihiko Tanaka and Shigeo Masuda, Nishinomiya-shi, Japan, assignors to Sumitomo Electric Industries, Ltd., Osaka, Japan, a company of Japan
Filed Sept. 16, 1968, Ser. No. 759,974
Claims priority, application Japan, Sept. 14, 1967, 42/59,020, 42/59,021; Apr. 6, 1968, 43/23,023; May 22, 1968, 43/34,518
Int. Cl. C23b 13/00; C23f 17/00
U.S. Cl. 204—38     8 Claims

ABSTRACT OF THE DISCLOSURE

A magnetic wire, produced by the steps of plating a copper wire with a metal such as nickel, iron, etc., and coating the plated copper wire with an electrically insulating paint composition by an electrophoretic coating. Further providing additional coating layers, formed by any prior art method, such as die coating, on the copper wire having the electrophoretically coated layer eliminates many difficulties encountered in the use of a single electrophoretic coating layer. The coating may be baked to increase the adherency thereof.

BACKGROUND OF THE INVENTION

Field of the invention

The present invention relates to novel magnetic wires and methods of producing the same.

Description of the prior art

With the advance of water-soluble paints and varnishes (hereinafter simply designated as paint for convenience' sake), electrophoretic coatings have recently found a wide range of utility in industries of various kinds. In electrophoretic coating, an article to be coated is positively charged with electricity, and the paint particles are negatively charged. In this manner, the surface of the article is coated with the paint in an adsorption-type manner by electrostatic force. An apparatus in which the coating process may suitably be carried out comprises a paint container provided with positive and negative electrode members to which a direct current may be applied.

In one prior art method of coating a copper wire electrophoretically, there is employed as the electro-deposited material a water-soluble polymer with suitable electrical properties produced by esterifying an epoxy resin with maleic anhydride, a fatty acid or the like, to produce a polymer paint, and then causing the polymer paint to react with ammonia or various amines. The use of the foregoing water-soluble polymer, however, causes the copper to begin to dissolve in the water-soluble polymer after the formation of a water-soluble copper complex with the ammonia or amines. This effect becomes greater when a current is applied to the copper serving as a positive electrode. Since the polymer film thus prepared is contaminated with copper ions, it is fragile and liable to crack after baking. The electric insulating property of this film therefore becomes lowered. By applying an electric current of lowered voltage to lower the amount of copper to be dissolved out requires long period of time, during which the copper wire must be within the paint container. Thus, a copper wire having a polymer film coated thereon of the desired thickness is not easily produced, when the rate of wire movement and the length of the container are considered.

For the reasons described above, it may be reasonable to conclude that an electrophoretic coating process is not applicable to a wire which is larger than 0.8 mm. in diameter when it is to have a coating film of a thickness greater than 20 microns.

SUMMARY OF THE INVENTION

It has been discovered that improved coatings utilized to form an electrically insulative wire may be formed by plating the "conductor" wire, which is preferably copper, with a metal such as nickel, iron, chromium, etc., prior to coating deposition.

An initial coating is deposited by means of an initial electrophoretic deposition from an aqueous bath, which preferably contains ammonia or amines. The bath contains resinous materials in an aqueous solution or emulsified paint compositions, those being utilized in prior art electrophoretic coating methods being well suited for use in the present invention.

The initial electrophoretically deposited layer is then preferably coated with an insulating paint composition by any prior art process except, of course, an electrophoretic process, since this coating will obviate voids, etc., in the electrophoretic layer.

Finally, the coated conductive wire is preferably subjected to a baking step to complete the coating process.

The above process enables the production of a very superior electrically insulated wire at a higher rate of deposition, a lower deposition current, and at increased efficiency due to the decreased number of coating-baking steps required, the greater thickness which can be deposited per pair, the lack of eccentricity in the final product, the decrease in wire break-down, etc.

An object of this invention is to eliminate the above-described defects caused by dissolving out of copper in the electrophoretic coating process.

BRIEF DESCRIPTION OF THE DRAWINGS

Figure 4:
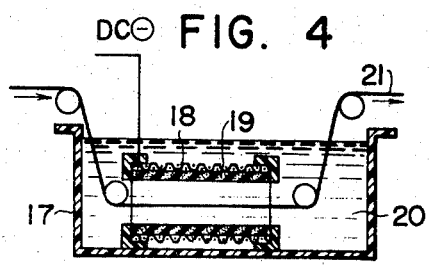
FIG. 4 is a semi-diagrammatic view showing, in cross sectional view, an electrode section of an electrophoretic coating apparatus of this invention having an insulating porous member inside an electrode.

In the accompanying drawings, FIG. 5 is basically the same view as FIG. 4 with the exception that a paint container serves itself as an electrode.

DESCRIPTION OF THE PREFERRED EMBODIMENTS

According to the method off this invention, a copper wire is plated with nickel, iron, chromium and the like to a thickness of from 0.5 to 1 micron. The provision of a plated metal film on the surface of the copper wire prevents the copper from dissolving out in the aqueous solution which contains ammonia or amines, and the paint particles may be coated onto the surface of the plated metal film if a direct current (with or without an alternating current) is applied. As for the protective metal which is plated on the copper wire, nickel and iron are preferred. Chromium is not preferred because of difficulties in plating and a trend towards cracking. Neither tin nor zinc are preferred, mainly from a production viewpoint, because the rate of wire movement must be reduced with a lowered baking temperature after the formation of the coating film, due to the low melting points of these metals.

With the method of this invention a number of advantages are attained, among which is that a copper wire plated with nickel or iron can be coated with nearly ten times as much paint, when compared with a copper wire having no plated film. In particular, a nickel film does not exert harmful influences upon the insulating characteristics and anti-aging properties of the coating film. In addition, it is possible to provide an insulating coating film of great thicknes onto the outside of a bare wire, even if it is of large diameter. Also, an electric current below about 100 volts is sufficient to conduct the electrophoretic coating method of this invention, whereas in an ordinary or conventional electrophoretic process, which employs a bare non-plated copper wire, requires a current as high as 100 volts or higher. Finally, a metal plated copper wire is capable of being moved through a coating vat at a rate about five times as fast as that of a non-plated wire, thus giving very good efficiency.

It is another object of this invention to produce an insulating wire having good characteristics, being free of eccentricity with high efficiency by means of an electrophoretic coating process which avoids difficulties encountered in the prior art coating methods.

It is well known in the art that an insulating wire can be produced by a method which comprises the steps of coating electroconductive wire with an insulating paint composition composed of one or more polymeric substances and an organic solvent or drying oil, and baking the coating layer thus prepared. These two steps are repeated many times. The solids concentration of the paint composition in this process is generally in the range of from 25 to 60%, and certain limitation cannot be avoided (with respect to the amount of solids) in each coating step. In other words, too large an amount of paint composition in a coating step causes the coated film or layer to sag, illustrating the phenomenon of waving. In addition, the coated film begins to assume a foamed or pitted appearance, which lowers the performance of an insulating wire, as the solvent escapes therefrom by evaporation.

Thus, in a method of producing an insulating wire comprising the steps disclosed above, i.e., coating an electroconductive wire with an insulating paint composition containing an organic solvent and baking the coated film, the amount of paint composition applied in each coating run is reduced to prevent the external surface of the coated film from becoming rough. Thus, it is necessary to repeat the aforesaid combination of coating and baking from six to twelve times, in general, until the desired film thickness is attained. One of the greatest difficulties encountered by the method described above is that the production efficiency per baking furnace remains low due to the necessity of repeating the coating-baking steps.

Another difficulty inherent in the aforesaid method is that the coated film or layer which extends over the outer surface of wire is lacking in uniformity of thickness due to the unbalanced position of the wire, dislocation of the coating die, and mechanical vibration of coating and/or baking apparatus. Because of the eccentricity resulting from these faults, the coated film is liable to suffer a dielectric breakdown at a portion of smaller film thickness and to be injured by a guide roller during winding or during coiling on a reel. This, of course, will lower the reliability of an electric or electronic device in which the insulating wire is used.

Still another difficulty of the above method is that a large quantity of paint composition and wire must be thrown away at the time of changing over to another kind of paint composition and/or changing the dimensions of wire. This tendency will be larger, the greater the number of times the coating and/or baking step must be repeated.

It is, therefore, an additional object of this invention to make the number of times of coating less, by increasing the thickness of each insulating layer coated per time. This is attained not by conventional coating methods, but by an electrophoretic coating process.

It is a further object of this invention to provide an insulating cover coat which is free from eccentricity, at least from the positioning of the core metal.

This invention will now be more particularly explained.

A resinous substance, contained in a water-soluble electrolytic or an emulsified paint composition, precipitates onto the surface of an electroconductive wire in electrophoretic coating. The materials known to the prior art are eminently suitable to the present invention. The wire having the resinous substance thereon is further coated with an electrically insulating paint composition, followed by baking, to produce a coating film of uniform thickness free from eccentricity. Since this electrophoretic coating utilizes electrical energy in the form of a direct current, either with or without an alternating current, small particles of the resinous substance, which are electrically charged in an aqueous solution, are forced to uniformly precipitate onto the surface of the electroconductive wire thereby producing a uniform and well centered cover layer thereon. A new precipitation layer in accordance with the electrophoretic coating process of this invention is more a porous accumulation than a solid film, in the strict sense, so that there is involved the risk that a coating film with a smooth surface free of pin holes will not always be produced, even if the porous precipitation layer is subjected to a baking process. This is because small particles of the resinous substance precipitated sometimes form a film-like layer without complete fusion, depending on the kind of resinous substance and the baking condition. This is the reason why the wire having a precipitation layer is further coated with an insulating paint composition.

Since an electroconductive wire is first covered with a precipitation layer of resinous substance by means of an electrophoretic coating process, and immediately thereafter coated with an insulating paint composition by any coating means well known in the art, such as a die, a wiper roller, felt, and the like, in accordance with the method of this invention, a number of the pin holes in the precipitation layer, i.e., spaces amoun the particles of resinous substance, are suitably filled with the insulating paint composition. Thus, a covered wire for electrical use having a smooth surface and no defects, as pin holes, is easily produced at a high efficiency.

An insulating wire with a coating film of a previously determined thickness produced by a single coating step with an electrophoretic coating process has a defect in that the breakdown voltage is low, as well as some troubles with its external appearance, including pin holes. In fact, measurements carried out to determined the breakdown voltage in a twisted wire condition of two kinds of enameled wire of the same film thickness( JIS C 3202), one being produced by a single coating step and the other by a double coating step, shows a great difference.

In accordance with the method of this invention, a wire is first subjected to an electrophoretic coating process, then to an ordinary or conventional coating process well known in the art, and finally to a baking process, to produce an insulating wire having an insulating coat of a double-layered construction, which eliminates various difficulties encountered in prior art methods.

By the term "the double-layered construction" is meant that two different coating processes are employed to form an insulating film on a wire which is independent of the kind of coating composition used. A case where only one kind of coating composition is used may be included within this class as long as both an electrophoretic coating process and any of the prior coating processes other than an electrophoretic process are employed. A layer forming the outer portion of an insulating coat may be produced by a double coating step (more steps can be used) without departing from the meanings defined above.

When an insulating paint composition to be applied to form the outer coat is an aqueous, water-soluble or emulsified paint of the same kind as the paint composition forming the inner or under coat, immediate use after the application of the latter may be allowed. However, it is difficult to apply an outer coating paint, such as a resinous paint composition containing an organic solvent, immediately after the completion of electrophoretic coating, because many of the solvents and resinous substances are water-insoluble. Specifically, it is impossible to uniformly coat the resinous paint composition because of precipitation of the resinous substance. In this case, it is necessary to remove any water or moisture adhering to the resinous substance which is electrically deposited, after the electrophoretic coating step. Simple evaporation of water will be enough for the purpose of drying.

Although various drying methods may be used, we have succeeded in suitably applying a water-insoluble, resinous and insulating paint composition to form an outer or uppermost coat film by means of a hot blast, or merely by passing a wire having a freshly coated film through a heating chamber maintained at a temperature as low as about 100° C.

With a water-soluble resin paint, drying is not especially required, but drying to a certain extent may be carried out without substantial harm. Hence, it will be apparent, in accordance with the method of this invention, that an insulating wire having the desired coating thickness which is uniform both radially and axially, can easily be produced by a two-step coating and baking process, with increased efficiency for each baking apparatus.

It is a still further object of this invention to provide a magnetic wire which is produced by the steps of subjecting a wire to an electrophoretic coating process, then to a conventional coating process (without baking), and then subjecting it to a baking process only once.

More particularly, we have succeeded in producing an insulating wire of the desired film thickness, the cover coat being uniform and free from eccentricity in its positioning relative to the wire as a core member, by coating method requiring only a small number of coating steps, the method comprising the steps of causing small particles of resinous substance contained in a water-soluble or an emulsified electrolytic paint composition to precipitate uniformly on the surface of an electroconductive wire with the aid of electrical energy until the percipitation layer becomes 30–80 percent as large as the previously determined film thickness, further applying thereon any insulating paint composition well known in the art from once to several times by a prior art method, and then baking it. Since the electrolytic paint composition is forced to deposit onto the electroconductive wire by means of electrophoresis, the thickness of the coated film may be suitably adjusted by controlling the voltage of the electrical current applied thereto.

It is a still further object of this invention to provide a magnetic wire which is produced by the steps of subjecting a wire to an electrophoretic coating process, then to a conventional coating process (without baking), and then subjecting it to a baking process only once.

More particularly, we have succeeded in producing an insulating wire of the desired film thickness, the cover coat being uniform and free from eccentricity in its positioning relative to the wire as a core member, by a coating the method comprising the steps of causing small parmethod requiring only a small number of coating steps, ticles of resinous substance contained in a water-soluble or an emulsified electrolytic paint composition to precipitate uniformly on the surface of an electroconductive wire with the aid of electrical energy until the precipitation layer becomes 30–80 percent as large as the previously determined film thickness, further applying thereon any insulating paint composition well known in the art from once to several times by a prior art method, and then baking it. Since the electrolytic paint composition is forced to deposit onto the electroconductive wire by means of electrophoresis, the thickness of the coated film may be suitably adjusted by controlling the voltage of the electrical current applied thereto.

In accordance with the method of this invention, the following advantages may be attained: the number of coating steps may be twice as small as in the prior art; neither bubbling nor blistering occurs during the course of manufacture; and an insulating wire having an insulating film strongly adherent to the core wire will be produced more economically and with a higher efficiency than in any prior art method.

As preferred water-soluble resins in accordance with this invention, there are exemplified polyesters, melamines, acrylates, the epoxy series and the like, all of which are dissolved in water after being converted into a corresponding salt, such as an ammonium salt, respectively. These materials are well known in the prior art as electrophoretic coating materials and it is believed that no further discussion at this point is warrented.

Some of these resins may remain in the form of emulsified particles negatively charged. The film thickness attained by the electrophoretic coating technique of this invention is on the order of 25 microns, which would cause a risk of blistering if a prior coating method was employed. However, the succeeding baking can suitably be effected with no blistering, because particles of the resinous substance, containing a very small amount of solvent used, have already been precipitated on the surface of wire. Most coating films made from various electrolytic paint compositions which have already been developed are mechanically weak and thermally weak, so that it is advisable to employ as the coating method the types of single and/or plural coating steps, at least from the viewpoint of increasing the overall characteristics of the resulting coated film.

In the preferred embodiment of this invention, an overcoat forming paint composition is applied onto the surface of an undercoat which is of a certain thickness and has been formed by a single coating step using electrical energy, so that it is not necessary that the overcoat become large in thickness. Accordingly, the overall desired film thickness can generally be attained by using only one coating step with respect to the overcoat formation. By conducting the foregoing two coating steps i.e., the undercoat forming step and the overcoat forming step, continuously, an insulating wire can easily be produced on a large scale, which is the reason why an insulating wire thus formed can be supplied at low cost.

As for the insulating paint composition to form an overcoat in accordance with this invention, there are exemplified various paint compositions which have been used by the prior art in general, such as, for example, polyvinylformal paints, polyurethane paints, terephthalic polyester paints, epoxy paints, isocyanuric polyester paints, polyamideimide paints, polyimide paints, and the like. Judging from the characteristics of the coating films which are formed by applying the foregoing paints of a water-soluble nature, polyvinylformal, polyuretane, epoxy and terephthalic paints are most preferred.

It is a further object of this invention to provide an apparatus with which a thorough process for producing a magnetic wire from a copper wire can be carried out, which comprises means for plating the copper wire with a metal such as nickel, an electrophoretic coating device, a cleaning or washing device and a baking furnace or chamber associated with, or combined with, one of the above, in the order described.

A still further object of this invention is the provision of a plating means fitted for plating of the copper wire blank.

This invention will now be more specifically described by way of example with reference to the accompanying drawings. However, it should be understood that the present invention is not to be limited to the specific embodiments described hereinafter with reference to the accompanying drawings but may include various modifications designable by those skilled in the art without departing from the scope of the invention.

Figure 1:
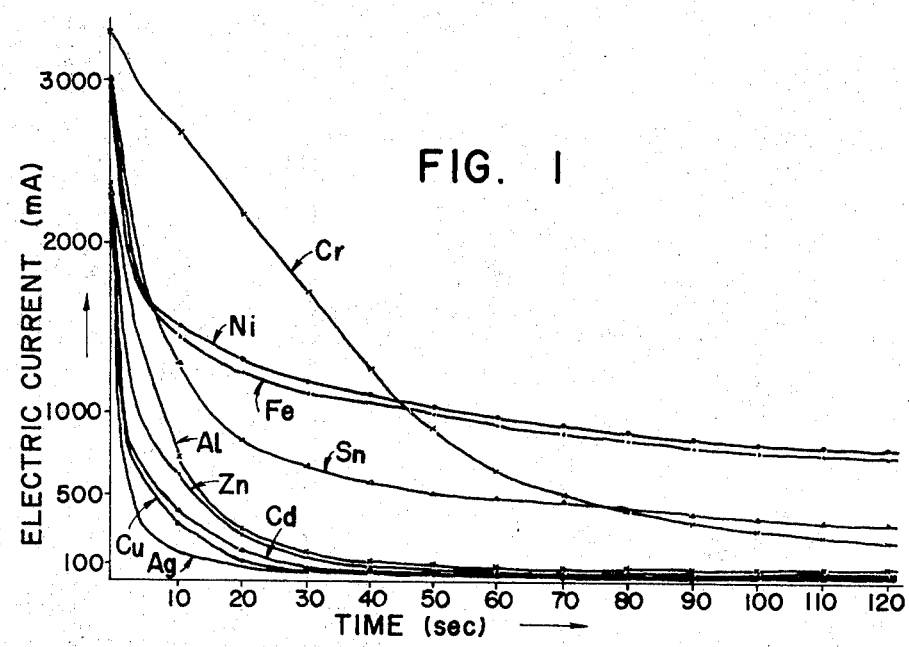
FIG. 1 is a graph illustrating the relationship between the time elapsed and the extent of the electrophoretic current applied when an epoxy ester is applied onto the surfaces of various metallic substrates in an electrophoretic coating process.
Figure 3:
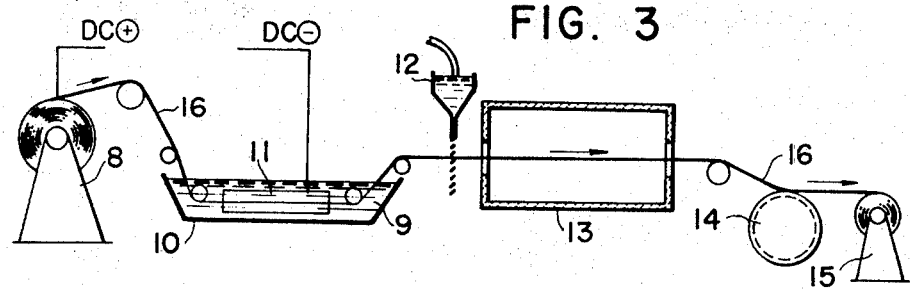
FIG. 3 is a semi-diagrammatic view of an embodiment of the invention illustrating an electrophoretic coating device of the lateral type, and means of the lateral type for the arrangement of an insulating wire.
Figure 5:
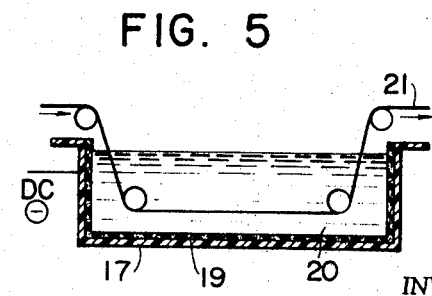
Figure 2:
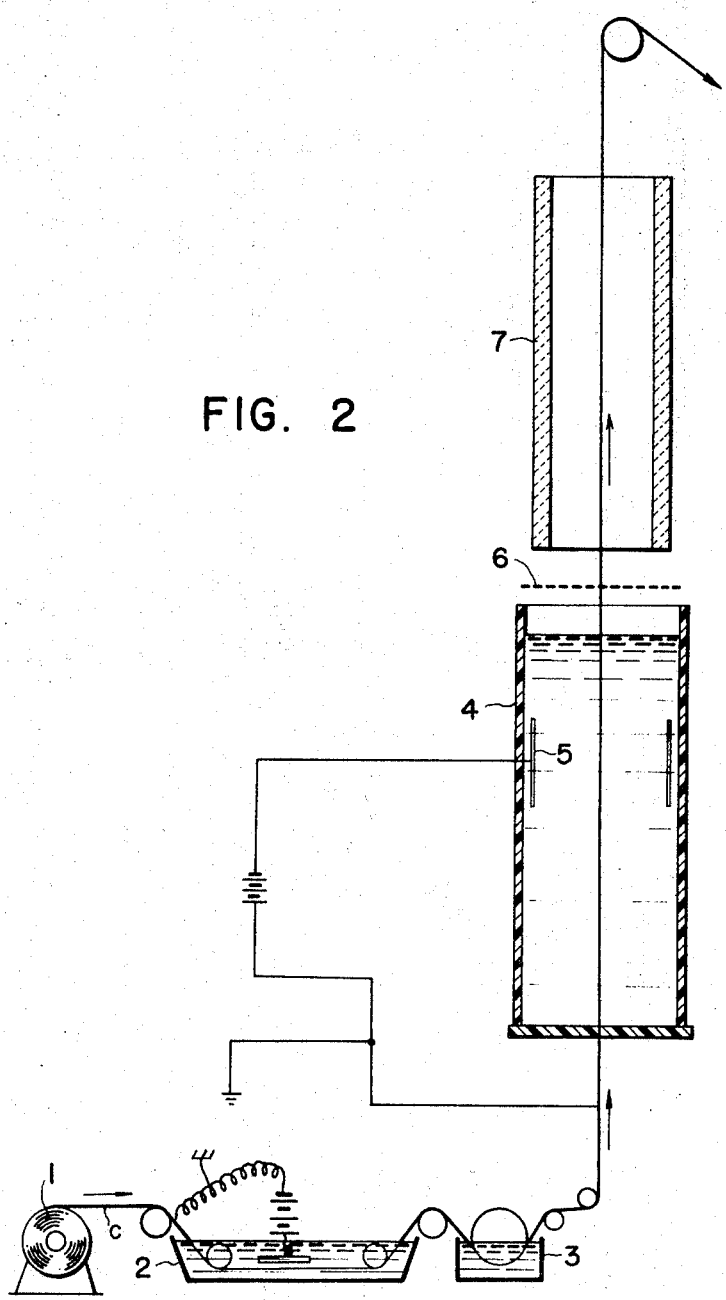
FIG. 2 is a semi-diagrammatic view showing an embodiment of the continuous type apparatus utilized to carry out the process of the present invention.

In the accompanying drawings, FIG. 1 is a graph illustrating the relationship between the time elapsed and the extent of the electrophoretic current applied when an epoxy ester is applied onto the surfaces of various metallic substrates in an electrophoretic coating process. FIG. 2 is a semi-diagrammatic view showing an embodiment of the continuous type apparatus utilized to carry out the process of the present invention. FIG. 3 is a semi-diagrammatic view of an embodiment of the invention illustrating an electrophoretic coating device of the lateral type, and means of the lateral type for the arrangement of an insulating wire. FIG. 4 is a semi-diagrammatic view showing, in cross sectional view, an electrode section of an electrophoretic coating apparatus of this invention having an insulating porous member inside an electrode. FIG. 5 is basically the same view as FIG. 4 with the exception that a paint container serves itself as an electrode.

Reference is now made to FIG. 1 of the drawings, in wich several plots of time vs. migration current curves are illustrated. Chromium, nickel, iron, tin, aluminum, zinc, cadmium, copper and silver plated members are immersed in a water-soluble epoxy ester paint (pH: 7.8, body: 9.8) in a vat, and a direct current of 70 volts is applied to electrodes 100 cm.$^2$ in area, with a distance of 10 cm. between electrodes. The migration current along the longitudinal axis of the graph is the sum of the ionic current from the metal serving as a positive electrode and the migration current from the epoxy ester, negatively charged. The thickness of epoxy ester coats were separately measured to see the difference between the metals. It was found that, for example, the amount of nickel migration per unit quantity of electricity was more than about ten times as large as that of copper. The definite integral from one time to another time of the time vs. migration current curve, i.e., the area bounded or enclosed by the curve on the coordinate axes, is approximately proportional to the amount of epoxy ester coated per unit of time. Thus, it is apparent that chromium, nickel or iron are capable of being electrophoretically coated with far greater amounts of epoxy ester than is, for example, copper. By applying the foregoing experimental results to the production of a magnetic wire, we have produced various magnetic wires with the aid of the apparatus, shown in FIG. 2 of this invention.

The apparatus of this invention comprises a plating bath (in which a wire is plated with chromium, nickel or iron) which serves to prevent undesirable reactions which may occur, depending upon the circumstances between the wire and the paint composition used, a paint bath for effecting an electrophoretic coating, a baking furnace and, if necessary, a washing means provided with the plating bath.

An electroconductive wire which has previously been plated with a metal and treated by the washing means, is passed through the paint bath which is filled with a dispersion of a paint composition, after it is negatively charged, whereby particles of paint (having a negative charge) in the bath are adsorbed onto the surface of the wire. Upon further movement of the wire, it reaches the baking furnace, maintained at a predetermined temperature by means of a heating element, to effect the baking of the adsorbed particles of paint.

An outline of the apparatus of this invention (with reference to FIG. 2) is as follows. A copper wire $c$ from a supply-stand 1 is plated with a metal film 0.5–1 micron in thickness in the plating bath 2 by any prior art method well known in the art. After cleaning in the washing means 3, it enters the paint bath 4 which is provided with stainless steel cathode plates 5, in which the copper wire $c$ serves as an anode. By means of an electro-attractive force between the copper wire $c$ and the particles of paint negatively charged in the paint bath 4 the former is coated with the latter in an electrophoretic adsorption process. The copper wire thus coated is then passed through a film of flowing water for the removal of particles of paint which are only lightly adhered to the surface thereof by mere physical forces, and it is finally treated in the baking furnace 7, and ready for winding. The film of flowing water 6, which is illustrated in FIG. 1, is omitted in FIG. 2. Alternatively, it may be of the type shown in FIG. 3 at 12. In order to avoid the formation of bubbles of air within the body of the flowing film of water, it is desirable to employ a rate of movement for the water which is as high as possible, otherwise there is a risk that voids or surface defects may be formed within or on the cover coat, during subsequent baking.

Although a number of metals such as, for example, nickel, iron, tin, zinc, cobalt, chromium, etc. are considered acceptable to plate a copper wire, due to the fact that the copper wire is not affected by ammonia or organic amines contained in the paint composition employed, nickel and iron are preferred. The use of cobalt or chromium is not desirable because they produce a plating film with a hardness markedly different from that of copper. In the case of tin or zinc, there is a shortcoming in that the baking must be carried out at a temperature below 170° C. However, to rectify this a baking furnace of longer length or else the employment of smaller rate of wire movement may be available. The use of silver is, of course, not preferred, because it has a tendency to dissolve in an aqueous solution containing amines.

The manner of using the apparatus in accordance with the present invention is as follows:

A plating bath 2 made of vinyl chloride which is 1 m. long, 10 cm. wide and 10 cm. high was filled with an aqueous solution of 220 g./l. nickel sulfate. A 0.4$\phi$ mm. copper wire was pasesd through this bath 2 at a rate of 20 m./minute to form thereon a nickel coating film 1 micron in thickness. A current density of 2 a./dm.$^2$ was used.

This nickel plated wire was introduced (continuously) into a resin bath 4 filled with an epoxy-ester resin containing ammonia through an 0.4$\phi$ mm. opening in the lowermost part thereof, and electrophoretically coated with particles of resin upon application of a direct current of 80 volts between the wire and stainless steel cathodic plates attached to the inside of the resin bath 4. The electrophoretically coated wire was moved upwardly, in that condition, from the bath 4, and then passed throughout a flowing film of water 6, serving as washing means positioned above the bath (as shown in FIG. 2). The thus coated wire was finally baked in a vertical-type baking furnace to produce an electrically insulating wire covered with a resin film of a thickness of 17 microns.

In the foregoing embodiment of the apparatus according to this invention, a direct current of 80 volts was applied between the nickel plated wire and the cathodic plates 5, but a direct-alternating mixed current may also be useful for this purpose.

It is well known to promote the brightness in a metal plating by mixing a direct current with an alternating current. In an electrophoretic coating process, the resin film obtained by mixing the bath currents was thicker than the resin film obtained only by using a direct current.

The wire had a smaller number of pinholes and a better electrically insulating coating when a mixed bath current was used. A fine electrically insulating wire could not be produced by using only a direct current, for film destruction resulted at voltages of more than 90 volts, and the current variation was ±100 ma.

When an alternating voltage was applied in addition to the direct voltage, the current variation was reduced to ±20 ma., and the above described destruction did not occur at a direct voltage of 90 volts.

By the above described operation, a fine electrically insulating wire was obtained.

The ratio of direct voltage to alternating voltage is most preferably 10:3. For example, when the direct voltage is 100 volts, the alternating voltage is within the range of from 5 to 95 volts. When the alternating voltage is greater than the direct voltage, electrophoretic coating does not occur because current does not flow.

*Example 1.*—A direct-alternating mixed voltage was applied between a 0.1φ mm. nickel plated copper wire and a 20 cm. long, 10 cm. diameter electrode in a bath filled with a water-soluble resin at a concentration of 10% and at a pH of 7.8. Table 1 shows the data obtained in the operation with a direct voltage of 40 volts and a direct current of 180 ma., an alternating voltage of 20 volts and an alternating current of 50 ma. The wire-rate was 30 m./min. The baking temperature maintained in the baking furnace was 440° C.

*Example 2.*—A direct-alternating mixed voltage was applied between a 0.26φ mm. copper wire and a 20 cm. long, 10 cm. diameter electrode in a bath filled with a water-soluble epoxy-ester resin at a concentration of 10% and at pH of 7.8. Table 1 shows the data obtained in operation at a wire rate of 22 m./min. The baking temperature maintained in the baking furnace was 470° C.

*Example 3.*—A direct-alternating mixed voltage was applied between a nickel plated copper wire and a 20 cm. long, 10 cm. diameter electrode in a bath filled with a water soluble epoxy resin at the concentration of 10% and at pH of 7.8 to coat the wire with the resin.

Table 1 shows the data obtained in operation at a wire-rate of 22 m./min. The baking temperature maintained in the baking furnace is 470° C.

Another improved apparatus (shown in FIGS. 3, 4 and 5) was developed in addition to that of FIG. 2. An electrically insulating wire could be efficiently obtained which was better than the one produced by the FIG. 2 apparatus by using a horizontal-type electrophoretic coating bath and a cathode consisting of porous materials (as in the FIGS. 4 and 5). In FIG. 3, 8 is a wire supply, 9 is a resin for an electrophoretic coating process, 10 is the resin bath, 11 is electrodes and 12 is a washing apparatus with a water flowing film to wash the wire. 13 is a baking furnace, 14 is a capstan and 15 is a winding machine. 16 is a wire advancing in the direction of the arrow. The wire, used as anode, is passed from the supply 8 to a resin bath 10. 11 is a cathode. Wire 16, which is an anode, is coated with the resin between the wire and electrode 11 by an electrophoretic coating process.

The resins described above contain a water-soluble electrolytic resin or an emulsion resin consisting of epoxy esters, polyesters, acryls, phenols and others. These resins are generally used at a concentration of 5–20%. The resin coated wire in the resin bath is washed in the water-washing apparatus 12, baked in the baking furnace 13, withdrawn by the capstan 14, and wound by the winding machine 15.

In a more detailed explanation of the present invention of a variety of materials ranging from hard, broadly water-soluble resin at a concentration of 10% was used. A direct voltage of 100 volts and a direct current of 500–800 ma. was applied between the wire anode and cathodes, the wire being electrophoretically coated.

In the baking process, a 3 m. long electric furnace was used, maintained at a temperature of 500° C. The wire was passed through the furnace at a rate of 20 m./ min. and was coated with a 0.012 mm. resin film to form an electrically insulated wire which has a fine outward appearance and is not eccentric.

In producing a magnetic wire by this electrophoretic coating process, the present invention is characterized by the easy production of electrically insulating wire which has better electrical characteristics than conventional wires, by using an electrode made by the following method.

Wire is often accidentally broken in the furnace or in the operation of the winding machine when the wire was loosened at its supply and a short circuit occurs between the wire and the electrode in the resin tank. A

TABLE 1

| | Example 1 | Example 2 | Example 3 |
|---|---|---|---|
| Wire size (mm.) | 0.1 | 0.26 | 0.26. |
| Plating | Ni-plating | None | Ni-plating. |
| Overcoat resin | None | do | Epoxy-ester. |
| Film thickness (μ) | 6 | 10 | 11. |
| Continuity (pinholes/5 meters) | 0–5 | 0–5 | 0–4. |
| Abrasion resistance (strokes) (weight 200 g.) | 2 | 5 | 7. |
| Cut through temperature (° C.) | 130 | 140 | 140. |
| Mandrel diameter | Good for 1X | Good for 2X | Good for 1X. |
| Break-down voltage (v.) | 650 | 770 | 950. |
| Solvent resistance (50° C., 24 hrs.): | | | |
| Against styrol | 0 | 0 | 0. |
| Against benzoyl | 0 | 0 | 0. |
| Against furfural | X | X | X. |
| Against acetone | 0 | 0 | 0. |
| Chemical resistance (50° C., 24 hrs.): | | | |
| Against sulfonic acid (10%) | 0 | 0 | 0. |
| Against nitric acid (10%) | 0 | 0 | 0. |
| Against hydrochloric acid (10%) | 0 | 0 | 0. |
| Against sodium hydroxide (3%) | Δ | Δ | Δ. |

"0" means that the coating film does not peel away when rubbed with a nail.
"Δ" means that the coating film does not peel away when rubbed with a cloth.
"X" means that the coating film peels away when rubbed with a cloth.

This electrophoretically coated wire was again coated with the epoxy-ester water-soluble resin by a wiper roller.

very high current will pass between them, the electric current source being broken, and the process stopped.

Direct current breakdown may happen in the wire between the supply stand and the winding machine due to sideout slippage of the supplying wire from the guide rollers. When part of the wire in the furnace was heated, it easily broke. When the wire is broken, a short circuit is caused at the broken part of it due to the contacting of the wire anode with the electrodes in the resin tank. In this case, it takes a very long time to make repairs. In the simultaneous production of parallel wires, the cutting and slackening of the wire will have a harmful influence on the other wires.

The present invention was successful in preventing the wire from being cut in the resin tank by an electrode covered with a porous electrically insulating material as shown in FIGS. 4 and 5. The present invention may thus be characterized by the production of an electrically insulated wire having a fine coating by weakening the "edge effect" in an electrode by the use of electrodes covered with such a porous material. In addition, this also prevents the wire from being broken. The "edge effect" is characterized by the fact that an electrode's edges and corners were either heavily coated with a concentrated layer of material, or the edges and corners were dissolved out due to the presence of a large current density.

It is very important to weaken the edge effect in producing an electrically insulated wire. Because current density is concentrated around the entrance part of the cathode, the wire at this part is easily dissolved, and gases due to the electrolysis of water come out at this part. When the conductor metal and gases mix with the electrophoretic coating film, the electrically insulating character of the film declines. It is important to weaken the edge effect around the entrance part of the cathode to produce a fine electrically insulating wire, because of the reasons described above. The FIGS. 4 and 5 show a section of a resin tank and an electrode. 17 is a resin tank, 18 is an electrode, 19 is a porous electrically insulating material and 20 is a resin. The electrode 18 is a plate or a cylindrical net of iron, stainless steel or brass.

In FIG. 5, the resin tank itself is made of a conductive material. 19 is a porous electrically insulating material such as bisque, a compact layer of glass wool or a sintered vinyl chloride resin. By establishing this porous material between the electrode and the conductor, damage was decreased when the wire broke down. Thus, the repair time due to broken wire was shortened, and a fine wire was obtained by reducing the edge effect.

In the case of a cylindrical electrode, as in the FIG. 4, bisque which was 5 mm. thick, 40 mm. in a diameter and 250 mm. long was used. In the case of FIG. 5, a tank, whose inner surface was covered with a sintered vinyl chloride plate 1 mm. thick was used as a cathode.

The present invention does not need more than one baking process due to using an electrophoretic coating process, and this reduces any difficulty due to wire breakage and weakens the edge effect also. Thus, there is obtained a fine electrically insulating wire having no eccentricity.

An example showing the electrophoretic coating process which uses the apparatus described above will now be given.

*Example 4.*—A 1μ nickel film plated copper wire of 0.4 mm. diameter was introduced into a bath made of acryl resin pipe which was 10 cm. in diameter and 2 m. long.

The tank was filled with an epoxy ester water-soluble resin at a resin concentration of 10% and a pH of 7.8.

Stainless steel cathodes were established in the bath, and the wire was used as an anode. The wire was coated with the epoxy ester resin, baked in a baking furnace, and finally wound by a winding machine to form an electrically insulated wire.

TABLE 2.—EXAMPLE 4

|  | Ni-plated copper wire | Copper wire (for control) |
| --- | --- | --- |
| Conditions of production: |  |  |
| Bath voltage (v.) | 80 | 180 |
| Bath current (ma.) | 400 | 350 |
| Rate of wire movement (m./min.) | 20 | 8 |
| Baking temperature (° C.) | 500 | 450 |
| Characteristics of products: |  |  |
| Film thickness (μ) | 17 | 14 |
| Number of pinholes/5 m | 5 | 17 |
| Breakdown voltage (simple twisting) (v.) | 2,300 | 1,800 |
| Abrasion resistance (strokes—500 g.) | 24 | 11 |
| Mandrel diameter (after heating at 150° C. for 10 hrs.) | (1) | (2) |
| Heat shock (good for 150° C.—10 hrs.) | 3X | 5X |
| Chemical resistance (immersed at room temperature for 24 hrs.): |  |  |
| Hydrochloric acid (16%) | Good | Good |
| Sulfuric acid (d=1.2) | Good | Good |
| Sodium hydroxide (3%) | Good | Bad |
| Solvent resistance (immersed at 50° C. for 24 hrs.): |  |  |
| Benzoyl | Good | Good |
| Styrol | Good | Bad |
| Acetone | Good | Good |

1 Good for 2X.  2 Good for 3X.

The Table 2 shows the electrical characteristics and the coating conditions of the electrically insulated wire produced by subjecting the nickel plated 0.4φ mm. copper wire (or a copper wire) to the electrophoretic coating process of this invention. The resins used in the present invention contain phenol ester resins, melamine ester resins, acrylester resins, and others, except said epoxy ester resin.

The present invention is useful to prevent the wire from dissolving and the quality of the electrically insulating film from being reduced. As a film plated with nickel, iron and other metals is electrophoretically coated with the resin, in the electrophoretic coating process of the present invention, a lower voltage (80 volts at a 5 cm. distance between electrodes) is used than in prior processes consisting of plating a bare copper wire (150–180 volts at the distance between electrodes).

The film thickness of the former is 20μ and the latter is 12μ. A film thickness of 15–20 times as large as the prior art film thickness can be obtained by experimental processes in a vat.

The following examples show subjecting an electrically insulating wire produced by an electrophoretic coating process to the over coating process of this invention.

*Example 5.*—A copper wire 0.4 mm. in diameter was used as a conductor and a polyester resin was used as the water-soluble resin. A bath which was 10 cm. in diameter and 2 m. high was filled with the polyester resin to a height of 1 m. at a resin concentration of 10%.

A direct current of 130 volts was applied to the cathodes. The conductor was introduced into said bath at a rate of 8.0 m./minute. The current at the time was 600 ma. A pipe-type heating furnace which was 3 m. long was used. The temperature in the furnace was controlled so as to be 150, 250, and 450° C. in each of three separate sections from its entrance to its outlet.

The electrophoretic coating wire was coated with a terephthalic acid-ethylene glycol polyester resin at a resin concentration of 40% using a 0.51φ mm. die, and then introduced into a heating furnace to be baked. The heating furnace was a pipe-type furnace 3 m. long. The temperatures from the lower part of the furnace to the upper part were maintained at 200, 250 and 300° C., respectively. The coating which was produced by the electrophoretic coating process formed a 10μ thick film. The results are shown in Table 3 which follows Example 8.

*Example 6.*—A phenol ester resin at a concentration of 10% was used as the water-soluble resin and was applied 80 volts. A 40% polyvinyl formal resin was used as the overcoat resin. The electrophoretic coating bath, the baking furnace, the rate of wire and the diameter of the die were the same as those in Example 5. The results are shown in Table 3.

*Example 7.*—An epoxy ester resin at a resin concentration of 10% was used as the water-soluble resin and applied at 150 volts. A polyimide resin at a concentration of 40% was used as the overcoat resin. The conditions were the same as in Example 5.

*Example 8.*—An epoxy ester resin at a resin concentration of 10% was used as the water-soluble resin, and was applied 140 volts. A phenol-ester water-soluble resin at a resin concentration of 40% was used as the overcoat resin. The other conditions were the same as in Example 5. The following table shows the electrical character of the electrically insulating wire formed in the production methods of Examples 5 through 8.

was coated with a water-soluble epoxy ester resin at a concentration of 40%, by the use of a die, before the baking process. This wire was introduced into a baking furnace maintained at a temperature of 450° C. Table 4 shows the structure and character of this wire.

*Example 11.*—An electrophoretic coating bath was filled with a phenol-ester water-soluble resin at a concentration of 10% and at a pH of 7.5. A direct voltage of 80 volts was applied between a conductor and cathodes established in said bath. A current of 500 ma. passed between the conductor and the cathodes. A $0.4\phi$ mm. conductor was introduced into said resin bath at a rate of 17 m./min. to be electrophoretically coated. The electrophoretically coated conductor was coated with a phenol ester water-soluble resin by use of a wiper roller and was

TABLE 3

| | Example 5 | Example 6 | Example 7 | Example 8 |
|---|---|---|---|---|
| (1) Water soluble resin | Polyester | Phenol ester | Epoxy ester | Epoxy ester. |
| (2) Overcoat resin | Terephthalic polyester. | Polyvinyl formal. | Polyimide | Water soluble phenol ester. |
| (3) Wire size (bare) (mm.) | 0.4 | 0.4 | 0.4 | 0.4. |
| (4) Film thickness ($\mu$) | 20 (10+10) | 20 (8+12) | 21 (11+10) | 20 (10+10). |
| (5) Continuity (pinholes/m.) | None | None | None | None. |
| (6) Abrasion resistance (strokes) (weight 200 g.). | 15.5 | 23 | 20 | 12. |
| (7) Cut through temperature (° C.) | 250 | 220 | 350 | 180. |
| (8) Mandrel diameter | Good for 1X | Good for 1X | Good for 1X | Good for 1X. |
| (9) Break-down voltage (v.) | 2,700 | 2,900 | 3,300 | 2,500. |
| (10) Solvent resistance (50° C., 24 hrs.): | | | | |
| Styrol | 0 | 0 | 0 | 0. |
| Benzoyl | 0 | 0 | 0 | 0. |
| Furfural | Δ | Δ | 0 | X. |
| Acetone | 0 | 0 | 0 | 0. |
| (11) Chemical Resistance (25° C., 24 hrs.): | | | | |
| Sulfuric acid (10%) | 0 | 0 | 0 | 0. |
| Nitric acid (10%) | 0 | 0 | 0 | 0. |
| Hydrochloric acid (10%) | 0 | 0 | 0 | 0. |
| Sodium hydroxide (10%) | X | Δ | Δ | X. |

"0" means that the coating film does not peel away when rubbed with a nail.
"Δ" means that the coating film does not peel away when rubbed with cloth.
"X" means that the coating film peels away when rubbed with cloth.

Conventional coating methods using a die needed 7 separate coatings, but the present invention needed only 2 coatings. The present invention thus provides for the production of an electrically insulating wire which is cheap and very easy to produce.

The following example shows the production of a magnetic wire by baking the electrophoretic coating film and the overcoat film without the step of baking the wire before the overcoating process.

*Example 9.*—A solution bath was filled with an epoxy ester resin at a concentration of 10% and at a pH of 7.8.

A direct voltage of 130 volts was applied between a $0.4\phi$ mm. copper wire and the electrodes which were 20 cm. long and 10 cm. in diameter.

When a current of 700 ma. had passed between the wire and the electrodes, the resin precipitated on the wire. The coated conductor was wound by the winding machine at a rate of 15 m./min.

The conductor, moved upwardly from the electrophoretic coating bath, was introduced into a bath filled with an epoxy-ester water-soluble resin at a concentration of 40% to coat the porous parts of the electrically coated resin film with said resin. A die was utilized. The conductor was passed through a 4 m. long baking furnace maintained at a temperature of 470° C. The film on the conductor was baked to form a fine uniform surface. Table 4 shows the structure and the character of said electrically insulating wire. The table follows Example 14.

*Example 10.*—A solution bath was filled with a phenol-ester resin at a concentration of 10% and at a pH of 7.8. A direct voltage of 75 volts was applied between a copper wire of 0.4 mm. diameter and electrodes established in said bath. A current of 450 ma. passed between the conductor and electrodes. The electrophoretic coating wire then introduced into a baking furnace maintained at a temperature of 500° C.

Table 4 shows the structure and character of this wire.

*Example 12.*—A $0.4\phi$ mm. copper wire was electrophoretically coated, dried with hot air, coated with a polyester of terephthalic acid and introduced into a baking furnace maintained at a temperature of 470° C. to form a fine electrically insulating wire.

Table 4 shows the character of this wire.

*Example 13.*—An electrophoretic coating bath was filled with an epoxy-ester water-soluble resin at the concentration of 10% and at a pH of 7.8. A direct voltage of 130 volts was applied between a conductor and anodes in the bath. A current of 670 ma. was passed between a conductor and the electrodes. The conductor was passed at the rate of 12 m./min. through the bath.

The electrophoretically coated conductor was introduced into a long drying furnace maintained at a temperature of 150° C., then coated with a polyvinyl formal resin at a concentration of 15% by use of a die, and finally baked in a baking furnace at a temperature of 350° C.

*Example 14.*—An electrophoretic coating bath was filled with a phenol ester resin at a concentration of 10% and at a pH of 7.8. A direct voltage of 80 volts was applied between a conductor and electrodes in said bath.

A current of 500 ma. passed between a conductor and the electrodes. The wire was passed at a rate of 15 m./min. into the bath. The electrophoretically coated conductor was introduced into a long drying furnace maintained at a temperature of 200° C. and then coated with a polyurethane resin at a concentration of 40% and finally passed through a baking furnace maintained at a temperature of 350° C. Table 4 shows the structure and character of this wire.

TABLE 4

|  | Example 9 | Example 10 | Example 11 | Example 12 | Example 13 | Example 14 |
|---|---|---|---|---|---|---|
| (1) Water soluble resin | Epoxy esters | Phenol esters | Phenol esters | Epoxy esters | Epoxy esters | Phenol esters. |
| (2) Overcoat resin | Water soluble epoxy esters. | Water soluble epoxy esters. | Water soluble phenol esters. | Polyester of terephthalic acid. | Polyvinyl formals. | Polyurethanes. |
| (3) Wire diameter (mm.) | 0.4 | 0.4 | 0.4 | 0.4 | 0.4 | 0.4. |
| (4) Film thickness ($\mu$) | 20 (10+10) | 21 (3+18) | 20 (10+10) | 19 (9+10) | 21 (10+11) | 20 (10+10). |
| (5) Continuity (number of pinholes/5 m.) | 0-2 | 0-2 | 0-1 | 0-1 | 0-2 | 0-2. |
| (6) Abrasion resistance (strokes weight 200 g.) | 12 | 14 | 16 | 16 | 23 | 14. |
| (7) Cut through temperature (° C.) | 150 | 180 | 210 | 230 | 215 | 210. |
| (8) Mandrel diameter | Good for 1X | Good for 1X | Good for 2X | Good for 1X | Good for 1X | Good for 1X. |
| (9) Break-down voltage (v.) | 2,400 | 2,500 | 2,100 | 3,000 | 2,900 | 2,500. |
| (10) Solvent resistance (50° C., 24 hrs.): |  |  |  |  |  |  |
| Styrol | 0 | 0 | 0 | 0 | 0 | 0. |
| Benzoyl | 0 | 0 | 0 | 0 | 0 | 0. |
| Furfural | X | X | X | Δ | Δ | Δ. |
| Acetone | 0 | 0 | 0 | Δ | 0 | 0. |
| (11) Chemical resistance (50° C., 24 hrs.): |  |  |  |  |  |  |
| Sulfuric acid (10%) | 0 | 0 | 0 | 0 | 0 | 0. |
| Nitric acid (10%) | 0 | 0 | 0 | 0 | 0 | 0. |
| Hydrochloric acid (10%) | 0 | 0 | 0 | 0 | 0 | 0. |
| Sodium hydroxide (10%) | X | Δ | Δ | Δ | Δ | Δ. |

"0" means that the coating film does not peel away when rubbed with a nail.

"Δ" means that the coating film does not peel away when rubbed with cloth.

"X" means that the coating peels away when rubbed with cloth.

A bare copper wire was electrophoretically coated in the above examples, but a nickel or iron plated wire was also able to be electrophoretically coated in the examples as well as in Example 4.

Resins for use in the electrophoretic coating process of the present invention contain a water-soluble resin comprising a reaction product salt of a resin selected from the group consisting of polyester, melamine, acryl, epoxy, polyimide, polyamideimide, and others, with ammonia or an amine, or an emulsion made of thermoelastic resins selected from the group consisting of polyethylene, polytetrafluoroethylene, polyvinylchloride, and others.

These resins are broadly called electrolytic resins.

What is claimed is:

1. In a method for producing an electrically insulated wire wherein an electrophoretic coating process is utilized to coat a copper wire with an electrolytic resin at least initially in the form of a salt with at least one material selected from the group consisting of ammonia and amines, the improvement which comprises the steps of plating the wire with at least one metal selected from the group consisting of nickel and iron, prior to the electrophoretic coating process.

2. A method for producing an electrically insulated copper wire as in claim 1, wherein the electric current utilized for the electrophoretic coating process comprises an alternating current and a direct current mixture, and further wherein the alternating current voltage is lower than the direct current voltage.

3. A method for producing an electrically insulated copper wire as in claim 1 which further comprises covering a cathode plate for use in the electrophoretic coating process with a porous insulating material.

4. A method for producing an electrically insulated copper wire which comprises the steps of plating the wire with at least one metal selected from the group consisting of nickel and iron, electrophoretically coating the wire with an electrolytic resin which is at least one member selected from the group consisting of ammonia and amine salts of the resin, and baking the thus coated wire.

5. A method for producing an electrically insulated copper wire which comprises the steps of plating the wire with at least one metal selected from the group consisting of nickel and iron, electrophoretically coating said wire with an electrolytic resin at least initially in the form of at least one salt selected from the group consisting of ammonia and amine salts of said resin, coating the thus treated wire with an electrically insulating resin, the electrically insulating resin comprising at least one member selected from the group consisting of a polyester, a polyurethane, a polyacetal, a polyamide, a polyimide, a polyamide-imide and an epoxy resin, and finally baking the coated wire.

6. The method for producing an electrically insulated copper wire of claim 5, wherein the wire is baked following the deposition of the electrophoretic coating.

7. An electrically insulated wire which consists of a copper conductive wire, an electrically plated nickel film on said wire, and an electrophoretically deposited electrically insulating polymer film on said nickel film.

8. An electrically insulated wire as in claim 5 which is further coated with an electrically insulated film of at least one resin selected from the group consisting of a polyester, a polyurethane, a polyacetal, an acryl, a polyamide, a polyimide, a polyamide-imide and an epoxy resin.

References Cited

UNITED STATES PATENTS

| 3,362,899 | 1/1968 | Gilchrist | 204—181 |
| 2,802,897 | 8/1957 | Hurd et al. | 174—110 |
| 2,421,652 | 6/1947 | Robinson et al. | 117—128.4 |

OTHER REFERENCES

J. of Paint Technology, August 1966, vol. 38, No. 499, R. L. Koch II, p. 444.

Metal Finishing, April 1967, Ito et al., p. 53.

JOHN H. MACK, Primary Examiner

R. L. ANDREWS, Assistant Examiner

U.S. Cl. X.R.

204—40, 181